Patented Apr. 11, 1944

2,346,362

UNITED STATES PATENT OFFICE 2,346,362

SPRAY COMPOSITION

Clarence D. Dolman, Chelan County, Wash., assignor to Hercules Glue Company, Ltd., a corporation of California No Drawing. Application June 21, 1941,
Serial No. 399,229

6 Claims. (Cl. 167—42)

In Patent No. 2,195,696, dated April 2, 1940, I have disclosed an aqueous spray composition and a deposit builder enabling cumulative spraying of a finely divided solid plant protectant to be practiced. This composition has met with widespread success, particularly in the Pacific Northwest, in protecting the apple crop against codling moth attack with lead arsenate. Cumulative spraying enables an orchardist to deposit substantially any given weight of deposit he chooses upon vegetation, it only being required that the orchardist continue spraying so that layer upon layer of the plant protectant builds up on the vegetation surface. With prior deposit builders, once a given deposit weight was placed upon vegetation or fruit, the weight deposit could not be increased by spraying even though spraying was continued indefinitely.

In other localities, and in protecting other crops, cumulative spraying is not so necessary, and lighter weight deposits are desirable. I have found that by altering the relation of the ingredients disclosed in my aforesaid patent, particularly the oil to fatty acid material ratio, one is able to procure a limited amount of cumulative spraying, and thereafter a substantially uniform spreading of the material so that a uniform cover is secured on the vegetation or fruit of moderate weight.

In my prior patent I disclosed, for example, that various fatty acid materials could be employed together with an oil. I have now discovered that if the total fatty acid material quantity ranges between about a fifth to five times the quantity of oil present, then cumulative deposit of the solid plant protectant occurs only to a limited extent during spraying and thereafter the spray composition, when sprayed upon the fruit, breaks and spreads uniformly over the fruit so that complete but moderate coverage of the fruit or vegetation is secured. The amount of fatty acid material employed as an upper limit varies with the particular conditions and composition and is limited only by the fact that when too large a concentration of the material is present in the tank, the tank mix is unsatisfactory. As is disclosed in said patent, the fatty acid content is usually from 0.1% to 5% by weight of the protectant and of this none or all can be free fatty acid.

In practicing the invention, the various fatty acids, fatty acid soaps or esters disclosed in my aforementioned patent, can be employed together with the various oils. The various soaps or esters, totally or partially saponified or esterified, can be made up as disclosed in said patent, it only being necessary to alter the proportions of fatty acid material to oil. I have found that a mixture of about 21.5 pounds of neutral oleate soap mixed with 2¾ pints of oleic acid and then thinned with about 1¼ gallons of kerosene works suitably in a spray tank mix. Based on 100 gallons of water, from ⅛ to ½ pound of the mixture up to two pounds, particularly in the handling of arsenates such as lead arsenate can be used. This material can be made up in dry form if desired and incorporated with a dry absorbent carrier as appears hereinafter.

The invention is applicable to the deposit of any finely divided solid, substantially water insoluble inorganic metallic material effective as an insect repellant, contact poison, stomach poison, fungicide, or ovicide such as the various arsenates and arsenites, including basic copper arsenate, lead arsenate and astringent lead arsenate, fluorine containing compounds, insoluble copper salts, and basic copper sulphates. With the various fish poisons, including derris, cube, and other rotenone carrying materials, the several proprietary nicotine-bentonite compositions, and other organic materials well known in the art, such as xanthone, phenothiazine, it is necessary to employ a relatively large amount of a water soluble material providing a metallic ion in the spray tank. Sulfur is usually handled with lead arsenate so the metal ion is provided by the lead. The nature and quantities of the metallic ion providing material will be discussed further hereinafter. The plant protectant is usually present in an amount of from one to ten pounds per 100 gallons of water.

The tank mix is preferably stabilized by addition of a suitable stabilizing agent as casein, blood albumin, glue or other protective colloid. These I have found stabilize the tank mixture and prevent it from breaking and depositing the finely divided solid present (the insecticide, for example) on the tank walls. The stabilizer need be present in only a relatively small quantity, about 0.05 ounce usually sufficing, but more can be used, up to an ounce, per 100 gallons of water. The quantity of stabilizer varies with the solubility, more casein than blood being required, for example. The quantities can be as low as 0.01 ounce per 100 gallons but more can be used. When water insoluble finely divided solids as diatomaceous earth are employed relatively large quantities must be used to stabilize. This will be discussed hereinafter.

In some cases, optimum preferential oil wetting of the finely divided solid plant protectant is not obtained unless a small amount of a water soluble metal salt is included in the tank mix. The inclusion of one of these salts materially increases the build-up ability of the spray mixture. Zinc sulfate, alum, ferric sulfate and manganese sulfate have all been employed with success, the zinc sulfate being preferred. These are divalent or trivalent metal salts soluble in water. In some cases, monovalent metal salts as sodium carbonate, trisodium phosphate, and sodium silicate have been used successfully. With inorganic metallic plant protectants, the salt can be present in a small amount, usually less than an ounce per 100 gallons of water. The utilization of metallic ions with organic protectant is disclosed and claimed in my application Serial No. 338,371, filed June 1, 1940.

Because the preferred material of the present invention employs a relatively small quantity of oil, it is preferable that it be made up as a dry mix employing a dry, absorbent carrier material such as diatomaceous earth, bentonite, kaolin, fuller's earth, wood flour, and like dry carriers. The presence of these materials, in the amount of one half ounce or more per 100 gallons in the spray tank, provides a cover which is satisfactorily adherent to the fruit, smooth, and so extended on the fruit that a very complete cover is provided.

The presence of the dry absorbent carrier materials in the spray tank, even in such small amounts as ½ ounce per 100 gallons, has a further advantage in that the tank mix is more stable and does not break and to this extent it can replace the protective colloid. Further, the cover is such that, upon usual spray removal operations, the cover can be readily removed and the fruit suitably cleaned for market.

When the oil quantity is increased in the spray tank mix and the oil-fatty acid material quantity ratio is increased to about 10 to 1 and as the ratio is increased to 250 to 1 and as it approaches 400 parts of oil to one of the fatty acid material, the heavy, cumulative deposit typical of the compositions of my patent are secured. In this case the total of oil and fatty acid material added may be increased to as much as eight pounds per 100 gallons.

In making up a dry composition according to the present invention I have employed the following materials: 21.5 pounds of a fatty acid soap or ester as a substantially neutral sodium oleate, 2¾ pints oleic acid, ¾ pounds casein, 2½ pounds zinc sulfate, 46½ pounds of celite diatomaceous earth, and about 10 pounds (1¼ gallons) of kerosene. The oleic acid can be omitted or the soap or ester omitted and the free fatty acid content increased proportionately. Usually the free fatty acid is included in an amount of from 0.1% to 70% of the soap or ester; but no soap or ester need be present for the free acid alone can be employed with the oil. Various neutral or free fatty acid containing soaps and esters which can be successfully employed are disclosed in my aforementioned patent. The material formed upon mixing the foregoing together is a dry free flowing powder. When added to the spray tank in an amount from a third to a half pound per 100 gallons of water, along with the inorganic metallic contact or stomach poison, for example, it suffices to provide the relatively light, but tight, smooth cover of the present invention. Of course, within the present invention, the material need not be made up as a dry mix. This is accomplished merely by reducing the amount of dry absorbent carrier present until the mass is liquid, or semifluid. The excess carrier present when the dry material is used is not deleterious in the spray tank; in fact it stabilizes the mix and extends the cover applied to the fruit. The dry carrier also protects the fatty acid material against the metal salt; for example, oleic acid and zinc sulfate can be carried on the diatomaceous earth without the zinc sulfate reacting with the acid prior to addition to the spray tank. The use of the dry carrier is not limited to those materials wherein the oil to fatty acid material is low for it can be successfully employed with compositions wherein the oil is vastly in excess.

The term fatty acid material is broadly used herein as including: (1) any one or a mixture of the fatty acids disclosed in my patent, preferably the unsaturated acids as oleic acid, which acids can be employed as such to the exclusion of other fatty acid materials; (2) a partially saponified or esterified fatty acid or mixture thereof; and (3) a totally saponified or esterified fatty acid or mixture thereof employed with or without added free fatty acid. The fatty acid material is employed in conjunction with any suitable animal, vegetable or mineral oil, usually one having a viscosity from about that of kerosene to about 120 seconds Saybolt. Such oils are kerosene, tung, Chinawood, soya bean, olive, linseed, cottonseed and like oils or a fish oil, preferably a non-drying one. The oil is preferably a liquid; if it is a solid at ordinary temperatures, it can be dissolved in a solvent and thus liquefied.

The effective components are the fatty acid material and the oil. These render the finely divided solid plant protectant preferentially oil wet in the presence of water. It is also essential to secure optimum build-up and deposit that the spray tank mix be at a pH between 6 and 8. Once the plant protectant has been flocculated and rendered oil wet, it is comparatively stable and the pH can then be made more alkaline. For example, when lead arsenate is flocculated in the tank and is oil wet, one can add thereafter lime or a Bordeaux mixture and still get satisfactory deposits. The lime acts as a safener to prevent arsenical injury. The final pH may be above 8 but initially and until the protectant has flocculated and is oil wet, the pH must be held between 6 and 8.

This application is a continuation in part of each of the following applications, Serial No. 268,619, filed April 18, 1939; Serial No. 284,451, filed July 14, 1939.

I claim:

1. A spray composition made up by mixing materials comprising proportionately 100 gallons of water, an effective concentration of an inorganic metallic, finely divided solid substantially water insoluble plant protectant, free oil, a material selected from the group consisting of a fatty acid, a fatty acid soap, a fatty acid ester, a partially saponified fatty acid, and a partially esterified fatty acid, the oil to material ratio being between 400 to 1 and 1 to 5, the material being present in an amount from 0.1% to 5% of the weight of protectant, and a small quantity of a dry, inert, finely divided carrier, said composition having a pH between 6 and 8, said oil wetting said protectant preferentially in the presence of the water and forming an inverted mixture therein.

2. A composition as in claim 1 containing a stabilizing amount of a protective colloid.

3. A composition as in claim 1 containing a small amount of a water soluble salt of a metal having a valence of at least two.

4. A composition as in claim 1 containing a small amount of zinc sulfate.

5. A composition as in claim 1 containing a small amount of alum.

6. A spray composition made up by mixing materials comprising proportionately (1) about 100 gallons of water, (2) a substantially water insoluble finely divided solid inorganic metallic plant protectant material suspended therein in an effective concentration, (3) at least about a sixth of a pound of a mixture (a) of an oil and (b) a material selected from the group consisting of a fatty acid, a partially saponified fatty acid, a partially esterified fatty acid, a fatty acid ester and a fatty acid soap, the oil to material ratio being in excess of a ratio of about 10 to 1 by weight, the composition having a pH between about 6 and 8, and (4) an amount of diatomaceous earth sufficient to stabilize the composition and extend the cover provided when the composition is sprayed on a fruit surface, said oil being available to oil wet said protectant preferentially in the presence of water and form an inverted mixture therein.

CLARENCE D. DOLMAN.